(12) United States Patent
Kates

(10) Patent No.: US 8,101,892 B2
(45) Date of Patent: Jan. 24, 2012

(54) SYSTEM AND METHOD FOR MONITORING FOOD

(76) Inventor: Lawrence Kates, Corona Del Mar, CA (US)

( * ) Notice: Subject to any disclaimer, the term of this patent is extended or adjusted under 35 U.S.C. 154(b) by 517 days.

(21) Appl. No.: 12/119,043

(22) Filed: May 12, 2008

(65) Prior Publication Data

US 2008/0204246 A1 Aug. 28, 2008

Related U.S. Application Data

(63) Continuation of application No. 11/086,602, filed on Mar. 22, 2005, now Pat. No. 7,372,003.

(51) Int. Cl.
*H05B 1/02* (2006.01)
(52) U.S. Cl. ............... 219/494; 219/497; 99/334
(58) Field of Classification Search ............ 219/702, 219/710, 714, 707, 494, 508, 497; 99/325, 99/451; 340/572.1, 309.15, 457.4
See application file for complete search history.

(56) References Cited

U.S. PATENT DOCUMENTS

| | | | |
|---|---|---|---|
| 6,294,997 B1 | 9/2001 | Paratore et al. | |
| 6,327,576 B1 | 12/2001 | Ogasawara | |
| 6,411,916 B1 | 6/2002 | Pellerin | |
| 6,617,963 B1 | 9/2003 | Watters et al. | |
| 7,080,593 B1 * | 7/2006 | Frankel | 99/326 |
| 7,372,003 B2 | 5/2008 | Kates | |
| 2002/0163436 A1 | 11/2002 | Singh et al. | |
| 2004/0100380 A1 | 5/2004 | Lindsay et al. | |
| 2004/0149736 A1 * | 8/2004 | Clothier | 219/627 |
| 2004/0174269 A1 | 9/2004 | Miller et al. | |
| 2006/0213904 A1 | 9/2006 | Kates | |

FOREIGN PATENT DOCUMENTS

| | | |
|---|---|---|
| EP | 1319928 A1 | 6/2003 |
| WO | WO 98-45806 A1 | 10/1998 |

OTHER PUBLICATIONS

Office Action dated Oct. 17, 2005 from Related U.S. Appl. No. 11/086,602.
Office Action dated May 18, 2006 from Related U.S. Appl. No. 11/086,602.
Office Action dated Aug. 30, 2006 from Related U.S. Appl. No. 11/086,602.
Office Action dated Jun. 6, 2007 from Related U.S. Appl. No. 11/086,602.
Office Action dated Sep. 19, 2007 from Related U.S. Appl. No. 11/086,602.
Notice of Allowance dated Jan. 16, 2008 from Related U.S. Appl. No. 11/086,602.

* cited by examiner

*Primary Examiner* — Mark Paschall
(74) *Attorney, Agent, or Firm* — Fulwider Patton LLP

(57) ABSTRACT

Systems and methods for monitoring conditions that affect the quality of food being served. Conditions such as temperature and elapsed time affect the quality of food and the safety of food consumers. Various embodiments of monitoring systems can be incorporated with different types of food containers. Sensors such as temperature probes can provide temperature information about the container and/or the food being served. The monitoring system can use such information in conjunction with elapsed time information in various ways. The monitored information can be displayed generally "real-time," or it can be stored for subsequent analysis. The monitored information can also be used to trigger an alarm or similar indicator when a condition detrimental to food-serving is present. Various embodiments of the monitoring system having such features can be packaged in various embodiments, including a self-contained unit and an assembly of modular components linked by wire and/or wireless connections.

18 Claims, 16 Drawing Sheets

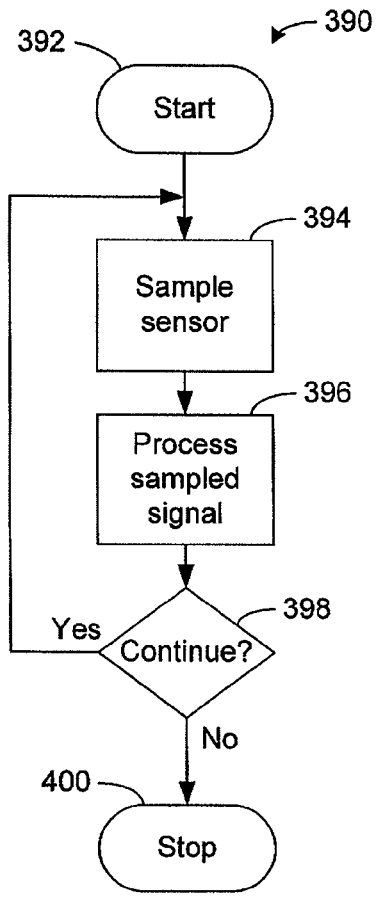
Fig. 13
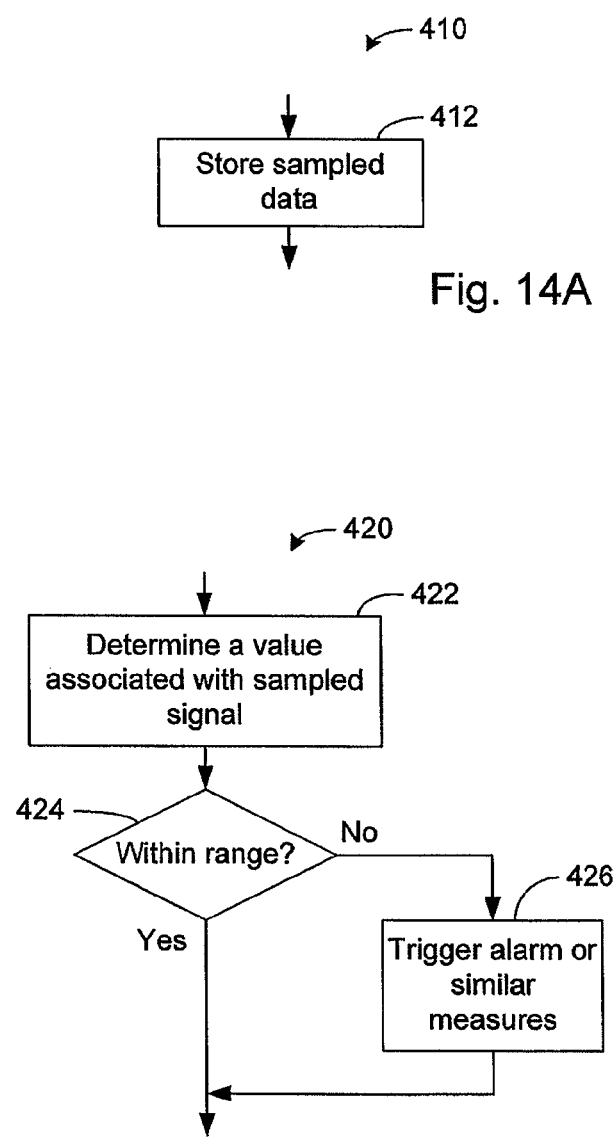
Fig. 14A
Fig. 14B

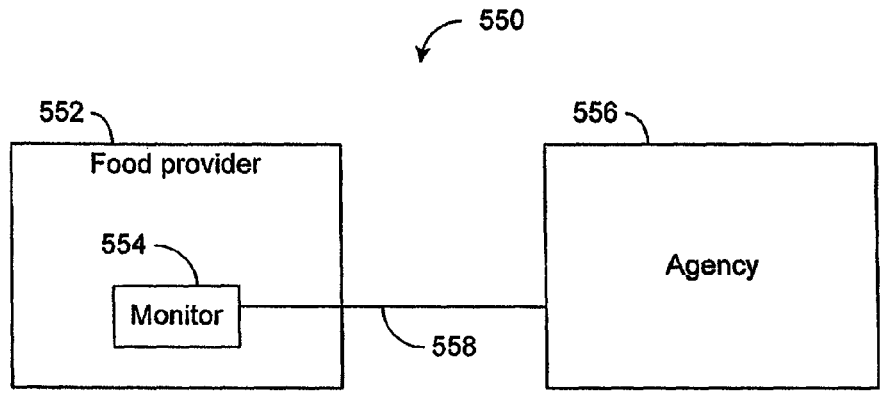
Fig. 18
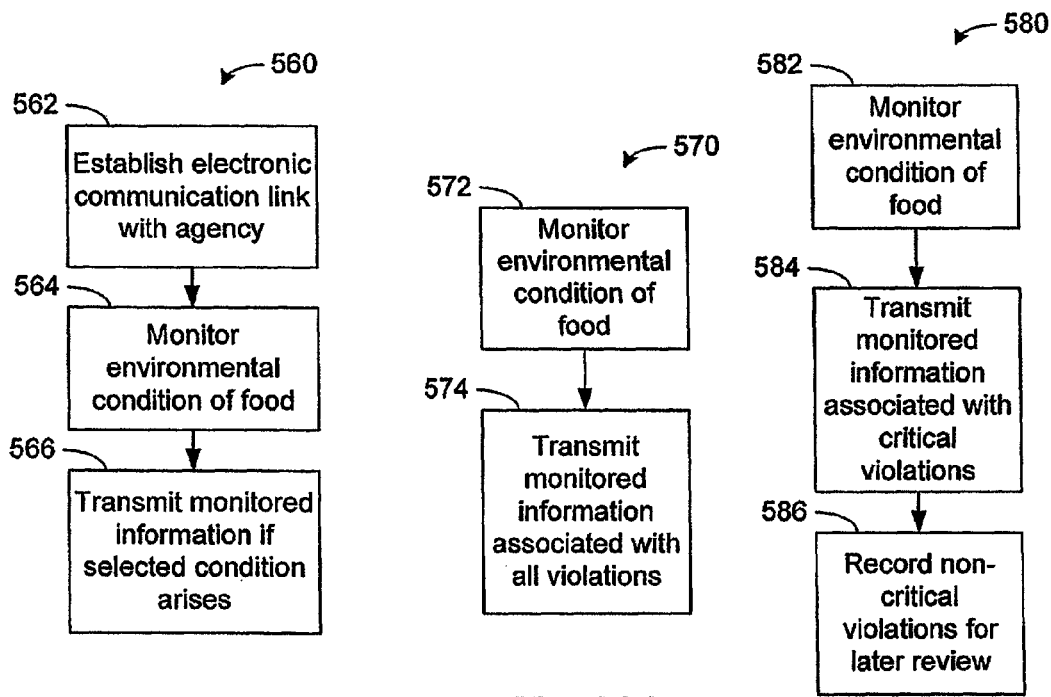
Fig. 19
Fig. 20A
Fig. 20B

SYSTEM AND METHOD FOR MONITORING FOOD

REFERENCE TO RELATED APPLICATION

The present application is a continuation of application Ser. No. 11/086,602, filed Mar. 22, 2005, titled "SYSTEM AND METHOD FOR MONITORING FOOD," the disclosure of which is incorporated herein by reference in its entirety.

BACKGROUND

1. Field

The present teachings generally relate to the field of food services and more particularly, to systems and methods for monitoring various parameters that affect the manner in which food can be presented.

2. Description of the Related Art

In many food service settings, food items are placed in the serving area so they can be served to the consumers. In settings such as buffets, some food items are self-served by the customers, while some are served by servers at the request of customers. In other settings, such as cafeterias and some fast-food food providers, servers dish out the requested food items to the customers.

In these and other situations, food items are typically brought out initially in relatively large quantities in containers, and left out for some time. To maintain the quality, and for health reasons, food items are typically kept at specified ranges. For example, warm food items are kept warm using different types of warmers. Likewise, cold food items are kept cold by ice or other similar cold objects. Kept at such conditions, food items are discarded if not consumed after a time limit. Such time limits and the condition surrounding the food are typically dictated by food safety regulations especially if the food is being served to the public.

A similar situation occurs in food storage. Many food items received a food provider must be stored at proper temperature and not used passed a specified expiration date.

In spite of the above problems, most food providers do not have any reliable tools for tracking the environmental aspects (e.g., age, temperature, humidity, etc.) of food in storage or on a serving line. The problems faced by regulatory inspectors and customers is even more acute, as they typically have less information available to them than the food providers. For example, inspectors and customers typically cannot tell how long a food item has been on a serving line or how old a food item is. Thus, there is a need for improvement in the way food is stored and served. In particular, there is a need for an improved method of monitoring the conditions that can affect the quality and safety of the food that is ultimately served.

SUMMARY

The foregoing needs are addressed by systems and methods for monitoring conditions that affect the quality of food being stored, prepared, and served. Conditions such as temperature, humidity, and elapsed time affect the quality of food and the safety of food. Various embodiments of the monitoring systems herein can be incorporated with different types of food containers. Sensors such as temperature sensors, humidity sensors, toxin sensors, etc., provide information about the container and/or the food being served. The monitoring system can use such information in conjunction with elapsed time information in various ways. The monitored information can be displayed generally "real-time," and it can be stored for subsequent analysis by the food provider and/or inspectors. The monitored information can also be used to trigger a display and/or an alarm to indicate when a condition detrimental to food-serving is present. Various embodiments of the monitoring system having such features can be packaged in various embodiments, including a self-contained unit and an assembly of modular components linked by wire and/or wireless connections.

In one embodiment, a food monitoring system includes a container for holding food, at least one sensor provided to the container, the sensor configured to provide a measurement indicative of one or more parameters, a timer that provides time information associated with the signal, an indicator apparatus, and a processor that processes the measurement and the time information, the processor configured to use the indicator apparatus to indicate the presence of a detrimental food condition corresponding to the food according to at least one of: a specified time limit expires, or a value associated with the signal is outside of a specified first range for a specified period of time, wherein the time limit and the first value are chosen according to a characteristic of the food. In one embodiment, the sensor comprises a temperature sensor. In one embodiment, the sensor comprises a humidity sensor. In one embodiment, the sensor comprises a chemical sensor. In one embodiment, the sensor comprises a biological sensor. In one embodiment, the indicator comprises a visual indicator. In one embodiment, the indicator comprises an audible alarm. In one embodiment, the indicator comprises a wireless transmitter.

In one embodiment, the system includes a control/readout module. In one embodiment, the control/readout module is configured to communicate with the processor using wireless communication. In one embodiment, the wireless communication comprises infrared communication. In one embodiment, the wireless communication includes radio frequency communication. In one embodiment, the control/readout module is configured to receive periodic transmissions from the processor. In one embodiment, the control/readout module is configured to send a query to the processor and to receive a response to the query.

In one embodiment, the sensor is detachable from the container.

In one embodiment, the processor is configured to use the indicator to indicate when the system for monitoring is working and has not detected a detrimental food condition.

In one embodiment, the indicator includes a display configured to show a type of the food. In one embodiment, the indicator includes a display configured to show a first display to a consumer and a second display to food processing personnel.

In one embodiment, the indicator includes a display configured to show a first display to a consumer and a second display to an inspector. In one embodiment, the processor is configured to store data regarding regulatory violations. In one embodiment, the processor is configured to store data regarding regulatory violations in a manner that can be read by an inspector. In one embodiment, the processor is configured to store data regarding regulatory violations in an encrypted manner that can be read by an inspector. In one embodiment, the processor is configured to send a message to a regulatory inspector when a regulatory violation is detected.

One embodiment includes a system for monitoring one or more parameters that affect the condition of a food by using an RFID tag having at least one sensor configured to provide a measurement indicative of one or more parameters related to edibility of the food. A processor reads the RFID tag to obtain data from the RFID regarding the one or more parameters. In one embodiment, the sensor includes a temperature sensor.

In one embodiment, the sensor includes a humidity sensor. In one embodiment, the sensor includes a chemical sensor. In one embodiment, the sensor includes a biological sensor.

In one embodiment, the processor provides a timestamp to the RFID tag. In one embodiment, the RFID tag stores the measurements for later readout. In one embodiment, the RFID tag includes an expiration date. In one embodiment, the RFID tag stores a history of the parameter. In one embodiment, the RFID tag stores a history of timestamps received by the RFID tag.

In one embodiment, the system includes a database system configured to store a record of information from the tag. In one embodiment, the database system configured to store a record of information from the tag for use by an inspector.

BRIEF DESCRIPTION OF THE DRAWINGS

FIG. 13 shows an example method of operating one embodiment of the monitoring system.

FIGS. 14A and B show example methods for processing signals for the method of FIG. 13.

FIG. 18 shows how the monitoring system can be functionally linked to a regulatory agency so as to allow at least some automated inspection capability.

FIG. 19 shows an example method for establishing the functional link between the monitoring system and the regulatory agency.

FIGS. 20A and B show example methods for automatically reporting different types of food-related health violations.

DETAILED DESCRIPTION OF SOME EMBODIMENTS

Figure 1A:
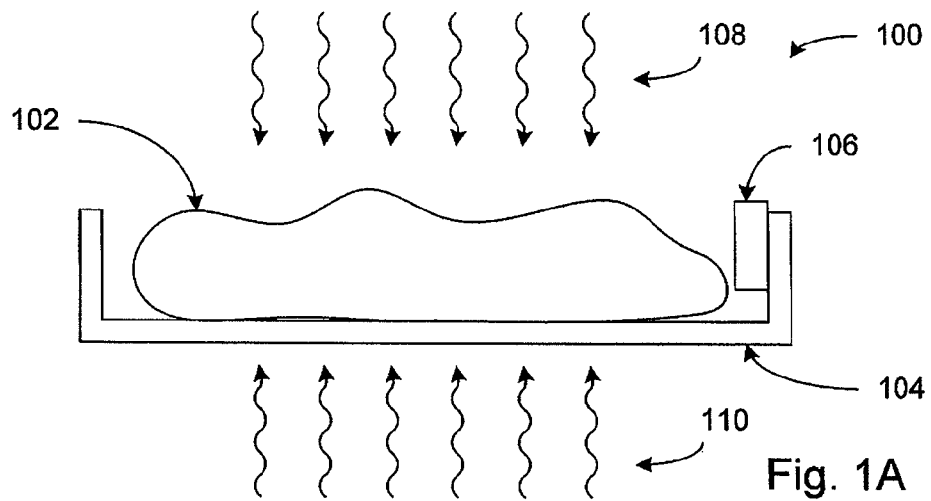
FIG. 1A shows by example one embodiment of a food serving apparatus having a monitoring system that monitors one or more environmental conditions such as warm temperature due to a heat.

The present teachings relate to systems and methods for monitoring one or more parameters that affect the manner in which food is stored and presented for consumption. By way of example, food presentation can include buffet settings. By way of example, food storage can include room-temperature storage, refrigerator storage, freezer storage, etc. It will be understood, however, that the concepts disclosed herein can be applied to any settings where food presentation occurs.

In many food serving settings, one or more food items are presented in one or more serving containers. Such food serving containers can have numerous shapes and sizes, and can be made from numerous materials. For example, some food containers are dish-like devices that can be used for relatively dry food items (e.g., bread, cookies, etc.). Other food containers can include some form of side walls that contain either bulky food items (e.g., salad) or food having liquids (e.g., soup, food with sauce, etc.). Other food containers can also include a cover to help maintain the quality of food being served.

In general, a food container includes some form of a wall or a collection of walls (referred to as a "wall" herein) so as to define a first area where the food is served. The wall separates the food from a second area (i.e., its surrounding), and can be substantially solid (i.e., does not allow passage of liquids) or porous. The wall of the container can be made from any number of materials suitable and safe for consumer use.

Food items served in such containers are subject to one or more parameters that can affect their quality. Such parameters can include, but not limited to, temperature, humidity, and time. For example, warm food items preferably should be kept warm, and cold food items preferably should be kept cold. Also, many food items tend to lose flavor and/or spoil with passage of time. As is generally known, food spoilage can cause health concerns, and the temperature to which food is subjected to can either accelerate or retard such spoilage. For these concerns that can affect the public, many regulatory agencies issue guidelines or regulations specifying how food items should be served.

Such guidelines or regulations can include how various food items are to be stored, prepared, and displayed. For example, certain types of food are to be stored within a specified range of temperature. Certain types of foods, when presented for consumption, are also to be kept at a specified range of temperature and for a limited duration. While various regulations can differ in different jurisdictions, most of them are based on the safety concerns of the consumers. Thus, when such regulations are not adhered to, a health safety violation can result.

Many regulations are established to provide different grades of violations. Frequently, a set of food-related regulations are formalized into a code. A food establishment that stores, prepares, packages, vends, and/or provides food for human consumption can violate such a code with different level of severity. Non-critical violations, also referred to as "blue violations," are violations that are not likely to directly contribute to food borne illness. Such violations can include general cleanliness issues associated with the food establishment. Critical violations, also referred to as "red violations" or "red critical violations," are violations that are likely to directly contribute to food contamination, illness, or other health hazards affecting consumers who consume food associated with the food establishment.

Many food safety codes also specify how various violations can accrue for a given food establishment. For example, a food establishment's permit can be suspended or revoked if, for example, the following example violations occur: one or more identical repeat critical violations on two consecutive inspections; three or more critical violations on two consecutive inspections; or ten or more non-critical violations on two consecutive inspections. These standards can vary in different jurisdiction; however, it will be apparent from the disclosure herein that various embodiments of food monitoring of the present teachings can facilitate compliance and/or enforcement of various food safety codes.

FIG. 1A shows an example food serving setting 100, where a food item 102 is served on one embodiment of a food container 104. The food container includes a parameter monitoring system 106 for monitoring one or more parameters that affect the food being served. As described below, the monitor 106 can be incorporated with the container 104 either integrally or as an add-on unit.

In the example food serving setting 100 of FIG. 1A, the food 102 being served is served warm. To maintain the desired warm temperature, the food 102 can be warmed by heat, either from the top (e.g., heat lamps) or bottom (e.g., fuel burners or electrical heaters). Thermal energies corresponding to the top and bottom warmers are depicted as arrows 108 and 110.

Figure 1B:
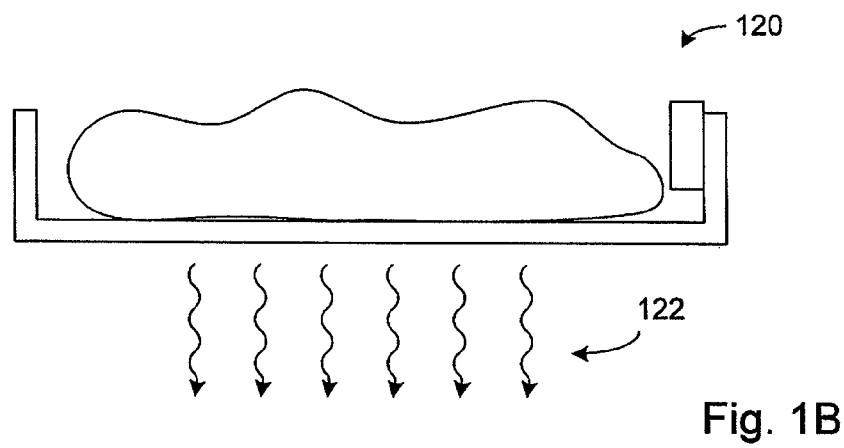
FIG. 1B shows by example that an apparatus similar to the food serving apparatus of FIG. 1A can also be for cold-served food.

FIG. 1B shows an example of a food serving setting 120 where the food is being served cold. To maintain the desired cold temperature, the food can be chilled by subjecting the container to cold objects such as ice or another chilled structure. Thermal energy corresponding to the example chilling is depicted as arrows 122.

Figure 2:
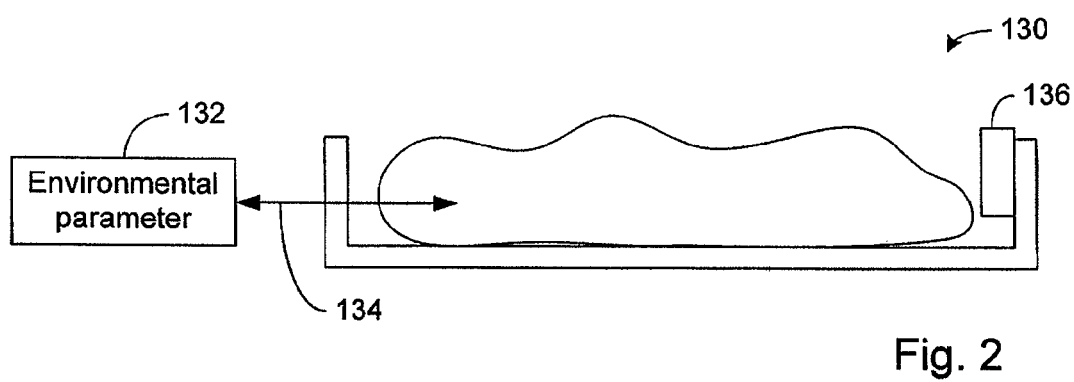
FIG. 2 shows a generalized depiction of one embodiment of a food serving apparatus having an environmental condition monitoring system.

The examples of environmental conditions described above in reference to FIGS. 1A and 1B can be generalized as a food serving setting 130 shown in FIG. 2. As shown, the food serving setting 130 includes an environmental parameter 132 that affects (indicated by an arrow 134) the quality of food being served. Such environmental parameter 132 is monitored by a parameter monitoring system 136 that is associated with the container on which the food is being served.

Figure 3:
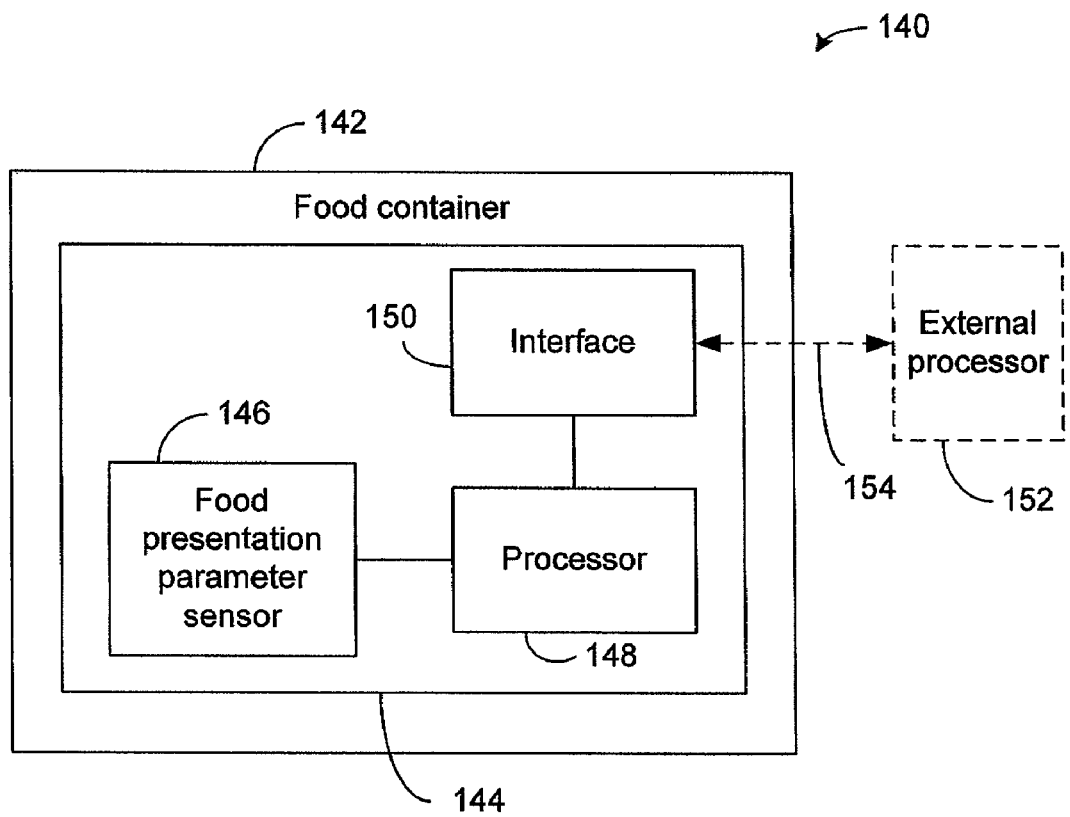
FIG. 3 shows a functional block diagram of one embodiment of the food serving apparatus having the environmental condition monitoring system.

FIG. 3 shows a functional block diagram 140 of a parameter monitoring system 144 that is functionally coupled to a food container 142. In one embodiment, the monitoring system 144 includes a parameter sensor 146 that is functionally coupled to a processor 148. The processor 148 is shown to be functionally coupled to an interface 150 that provides output and/or control interface function(s) with a user (not shown) and/or an external processor 152. In one embodiment, the external processor 152 and its corresponding functional coupling 154 are optional. Various manners in which the foregoing components can be implemented are described below in greater detail. Although the discussion below refers to a temperature sensor, one of ordinary skill in the art will recognize that the environmental parameter can include one or more sensors, such as, for example, temperature (monitored by a temperature sensor), humidity (monitored by a humidity sensors), food toxins (monitored by a chemical sensor), foot microbes (monitored by a biological sensor), etc. Thus, the temperature sensor described below is used by way of example, and not by way of limitation.

In general, it will be appreciated that the processors can include, by way of example, computers, program logic, or other substrate configurations representing data and instructions, which operate as described herein. In other embodiments, the processors can include controller circuitry, processor circuitry, processors, general purpose single-chip or multi-chip microprocessors, digital signal processors, embedded microprocessors, microcontrollers and the like.

Furthermore, it will be appreciated that in one embodiment, the program logic can advantageously be implemented as one or more components. The components can advantageously be configured to execute on one or more processors. The components include, but are not limited to, software or hardware components, modules such as software modules, object-oriented software components, class components and task components, processes methods, functions, attributes, procedures, subroutines, segments of program code, drivers, firmware, microcode, circuitry, data, databases, data structures, tables, arrays, and variables.

FIGS. 4-8 show by examples how one example environmental parameter can be functionally coupled to food serving containers in various manners. For the purpose of description, temperature is used as an example of the environmental parameter. It will be understood that the concepts disclosed herein also apply to other environmental parameters that affect the quality of food.

Figure 4:
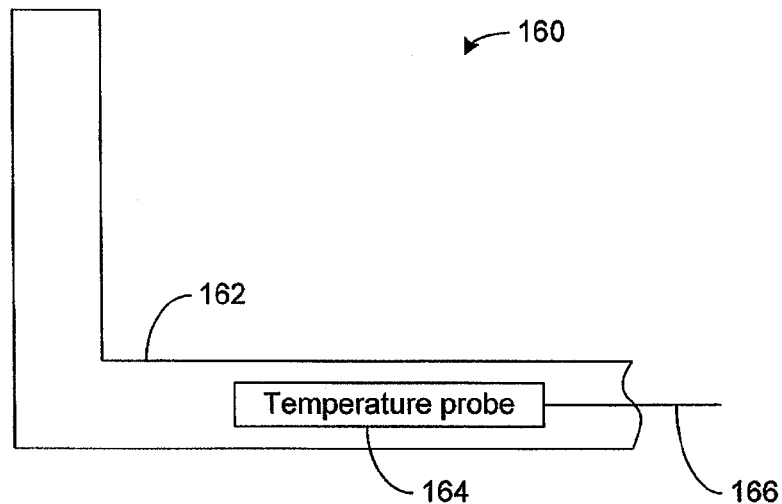
FIG. 4 shows one embodiment of the environmental condition monitoring system having an example temperature sensor embedded in a food serving container.

FIG. 4 shows that in one embodiment 160, a temperature sensing element depicted as a probe 164 is substantially embedded in a portion of a container 162. Functional coupling of the temperature probe 164 to a processor (not shown) is depicted as a line 166. It will be understood that the functional coupling line 166 does not necessarily need to be a conducting element. Example methods of wireless coupling are described below in greater detail.

In one embodiment, the example temperature probe 164 is embedded into the container 162 during the manufacture of the container 162.

Figures 5A, 5B:
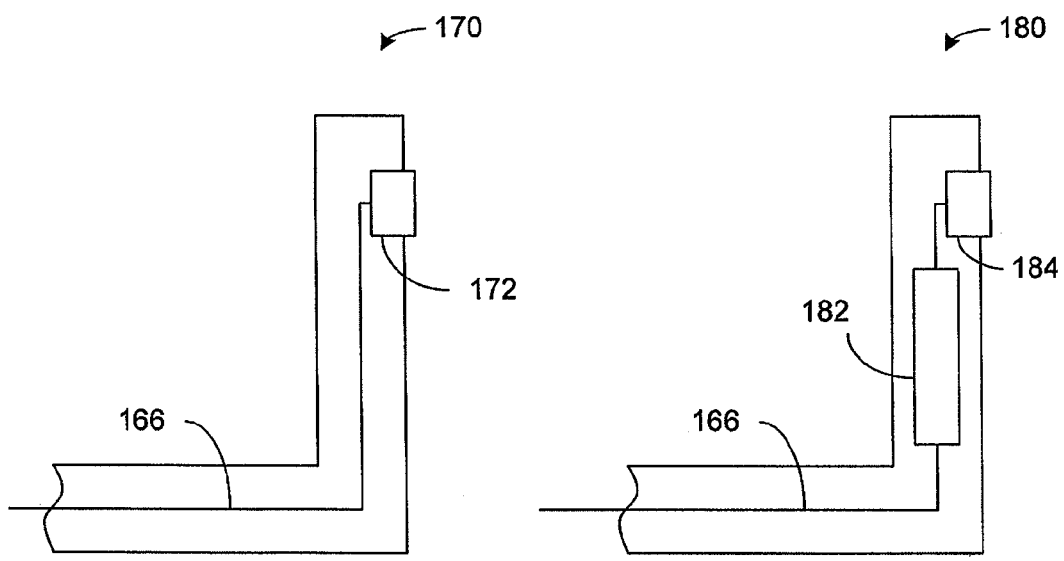
FIG. 5A shows that in one embodiment, a signal from the example embedded temperature sensor can be transmitted to an external component via a connector.
FIG. 5B shows that in one embodiment, a signal from the example embedded temperature sensor can be processed within the container.

FIGS. 5A and 5B show by examples that signals to and/or from the embedded temperature probe (not shown), via the coupling 166, can be processed in different ways. In one example embodiment 170 shown in FIG. 5A, the probe and an interface 172 are coupled by the coupling 166. In one embodiment, the interface 172 is a substantially passive coupling device that facilitates transmission of the signals to and/or from the embedded probe. Thus, in this particular example, processing of the signals from the probe is performed at an external location with respect to the container. The interface 172 can be a connector that allows such transmission via wires, or can be a wireless component that allows wireless transmission.

FIG. 5B shows another example embodiment 180 where the signals to and/or from the probe (via the coupling 166) are processed at least to some degree in a processor 182 that is also substantially embedded within the food serving container. The example embodiment 180 is shown to further include an interface 184 that can couple the processor 182 to an external component such as an external reader or another processor. In one embodiment, the interface 184 can include functionalities that allow it to interact substantially directly with a user.

In the example embodiments described above in reference to FIGS. 4-5, various components of the monitoring system are at least partially embedded within the container. Thus, in one embodiment, these substantially non-detachable components have, or are embedded in a manner to provide, resistance to damages caused by repeated use (e.g., heating, chilling, cleaning, etc.).

Figure 6:
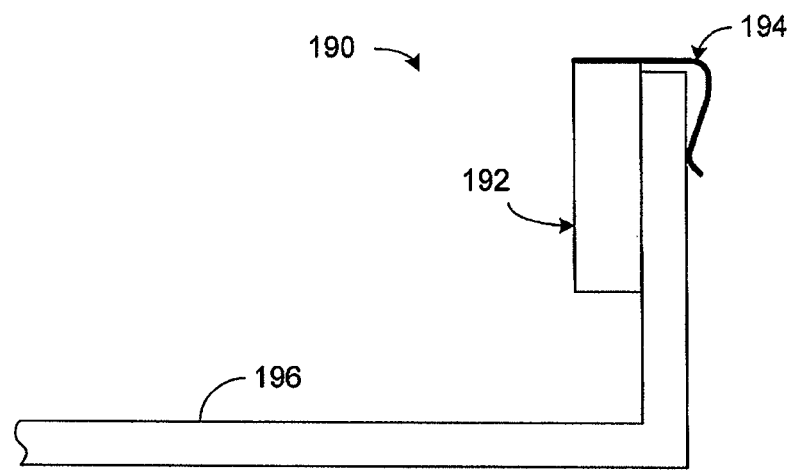
FIG. 6 shows one embodiment of the environmental condition monitoring system that can be mounted to a food serving container in a removable manner.

FIG. 6 shows that in one embodiment 190, the monitoring system is a detachable unit 192 that can be mounted to and from a container 196. For the purpose of description a clip 194, is shown to depict such detachable mounting. It will be understood, however, that detachable mounting of such an "add-on" unit can be achieved in any number of ways. For example, a magnet can be used for temporary attachment on certain metallic containers. In another example, adhesives can be used for non-permanent attachment in some applications. In another example, any number of mechanical attachment methods can be used to detachably mount various embodiments of the monitoring unit to various types of food serving containers.

Figures 7A, 7B:
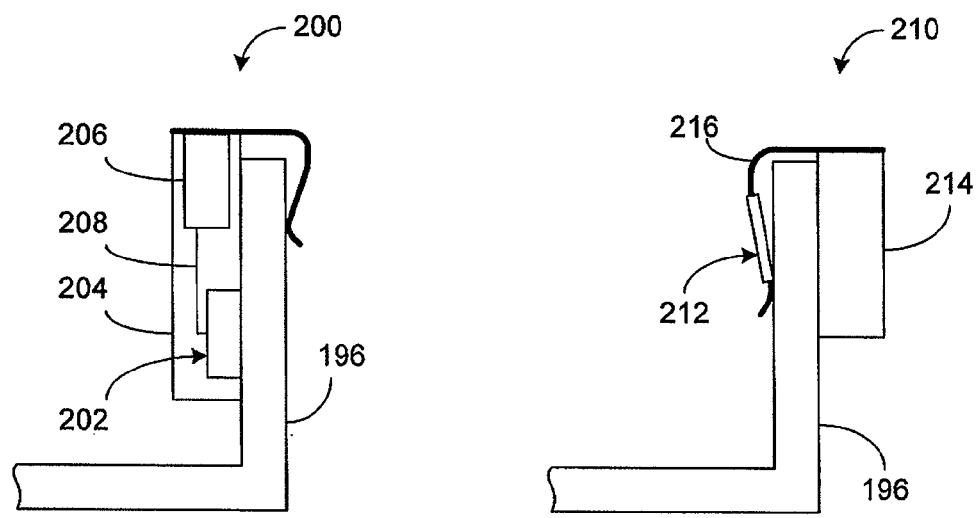
FIG. 7A shows that in one embodiment, the example temperature sensor can be within a common housing that houses other components of the monitoring system so that the sensor can measure the temperature of the container.
FIG. 7B shows that in one embodiment, the example temperature sensor can be located outside the housing so that the sensor can measure the temperature of the container.

FIGS. 7A and 7B show two examples of such detachable monitoring units. In one example embodiment 200 shown in FIG. 7A, a monitor housing 204 is shown to be detachably mounted to the container 196. In one embodiment, a temperature sensing element 202 is housed substantially within the housing 204. When the housing 204 is mounted, the sensing element 202 engages the surface of the container 196 to allow measurement of the container's surface temperature. In one embodiment, signals to and/or from the sensing element 202 is coupled to a processing component 206 that is also housed substantially within the housing 204. The processing component 206 can include the functionalities of signal processing, user-interfacing, and/or external-interfacing described above in reference to FIGS. 5A and 5B.

One can see that such a substantially self-contained monitoring unit can be used in conjunction with a variety of containers. Because such monitoring units are removable, they can be removed to allow cleaning of the containers without having to worry about damages (e.g., water damage) to the various components therein.

FIG. 7B shows another example embodiment of a detachable monitoring unit 210 having a housing 214 that can be mounted to the container 196 via an example mounting component 216. The mounting component 216 can be similar to that described above in reference to FIG. 7A. In the particular example shown in FIG. 7B, a temperature sensing element 212 is disposed at a location generally outside of the housing 214. When the monitoring unit 210 is mounted to the container 196, the sensing portion of the temperature sensing unit 212 preferably engages the surface of the container 196. As shown by FIG. 7B, one example way of achieving such engagement is to mount the sensing unit 212 on the portion of the mounting component 216 so that the mounting component urges the sensing unit 212 against the surface of the container 196. The sensing unit 212 can be coupled to a processing component (not shown) within the housing 214 in various manners, including via wire and wireless modes. Also, the processing component can have functionalities similar to that described above in reference to FIG. 7A.

One can see that the example configuration of the monitoring unit of FIG. 7B can be advantageous in certain applications. For example, the temperature sensing unit 212 and the mounting component 216 can be dimensioned and oriented to cause a relatively small circumferential (when viewed from the top of the container) "footprint." Such small engagement area can allow the use of the monitoring unit on containers having curvatures sufficient to be problematic for units that benefit from relatively "flat" engagements over larger areas.

Figure 8A:
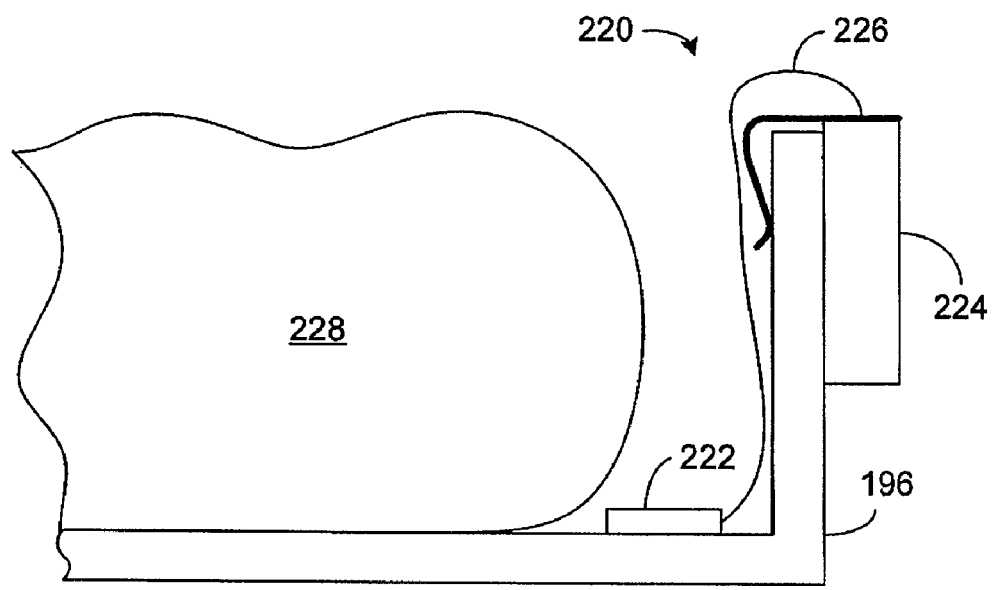
FIG. 8A shows one embodiment of the a removable monitoring system having a temperature sensor in the form of a probe monitoring the temperature of a surface of the container.
Figure 8B:
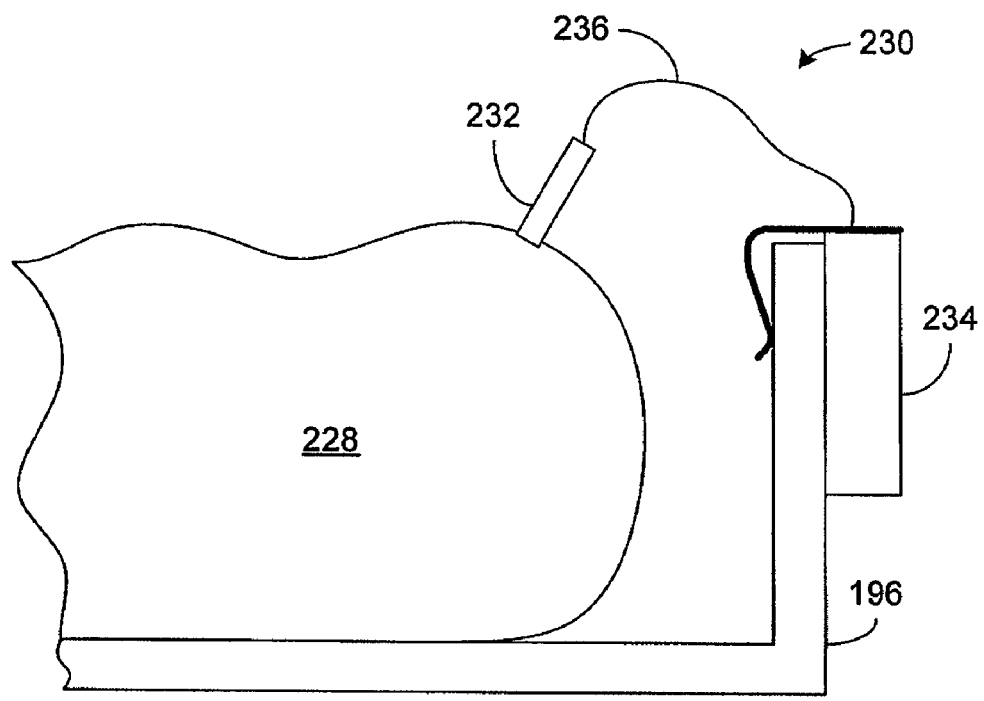
FIG. 8B shows that in one embodiment, a temperature probe can monitor the temperature of the interior portion of the food being served in the container.

FIGS. 8A and 8B show two examples of monitoring units having temperature sensing elements that can be located substantially away from their respective housings. In one embodiment shown in FIG. 8A, a monitoring unit 220 includes a temperature sensing element 222 coupled to a processing component located in a housing 224 via a coupling 226. The housing 224 is depicted as being mounted to the container 196 by an example clip, but it will be understood that other methods of mounting can also be used as described above in reference to FIG. 6.

As further shown in FIG. 8A, the coupling 226 allows positioning of the temperature sensing element 222 away from the housing 224 in a more flexible manner. In the particular example shown in FIG. 8A, the sensing element 222 is positioned at the bottom inner surface of the container 196 closer to a food item 228, where it might be more preferable to monitor the temperature at.

FIG. 8B shows another embodiment of a monitoring unit 230 having a temperature sensing element 232 coupled to a processing component located in a housing 234 via a coupling 236. Again, the housing 234 is depicted as being mounted to the container 196 by an example clip, but it will be understood that other methods of mounting can also be used as described above in reference to FIG. 6.

As further shown in FIG. 8B, the coupling 236 allows positioning of the temperature sensing element 232 in the food 228 to monitor the temperature therein. In certain food items, it can be more preferable to monitor the temperature of the food rather than its surroundings.

The example monitoring units shown in FIGS. 8A and 8B have couplings 226 and 236 that allow their respective temperature sensors to be placed at different locations in a more flexible manner. In one embodiment, the coupling itself is modular, so that it can be plugged into the processing component and/or the temperature sensor. Such modularity can provide more flexibility in monitoring of the food condition. For example, the sensor 222 and coupling 226 of FIG. 8A can be one modular unit configured for monitoring of the container temperature, and the sensor 232 and coupling 236 of FIG. 8B can be one modular unit configured for monitoring of the food temperature. The processing components and the housings 224 and 234 can be the substantially same unit that can receive either or both of these modular assemblies.

From the various example implementations described above in reference to FIGS. 4-8, one can readily see that numerous other configurations are also possible. Thus, the various embodiments shown and described should not be construed as limiting, but rather as examples of how various functionalities of a food-affecting parameter monitoring system can be implemented.

Figure 9:
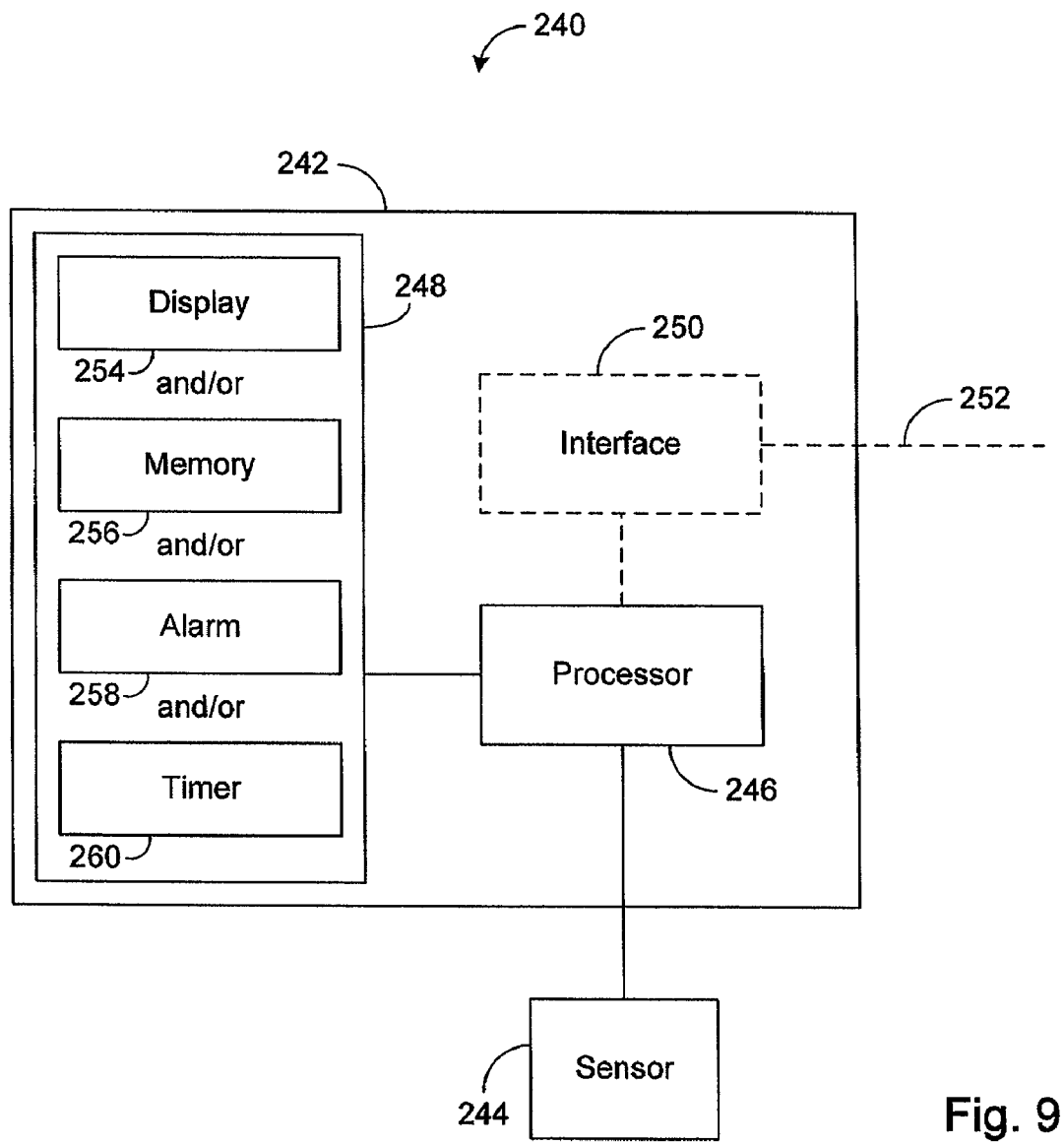
FIG. 9 shows a block diagram of one embodiment of the monitoring system having various example functionalities.

FIGS. 9-14 show how various concepts described above can be implemented in various ways in food service applications. FIG. 9 shows a block diagram of one embodiment of a monitoring system 240 having various example functionalities. The monitoring system 240 is shown to include a processing assembly 242 that has a processor 246. The processor 246 receives and/or controls a sensor 244. In the examples described above in reference to FIGS. 4-8, the sensor includes a temperature sensing device. As also described above, such a sensor can be packaged together with the processor (and other components) in a common housing, or be positioned away from the housing. It will be understood again that other food-affecting parameter(s) can also be sensed and monitored by the monitoring system 240.

As shown in FIG. 9, the processor 246 is linked to a function component 248 that can include, but not limited to, functionalities such as display 254, memory 256, alarm 258, and/or timer 260. Example implementations of such functional components are described below in greater detail.

As further shown in FIG. 9, the processor 246 can also be linked to an interface 250 functionality that allows interfacing of the processed or substantially unprocessed signals associated with the sensor 244 with an external component. Such an external interfacing is depicted by a line 252. Example implementations of such external interfacing are described below in greater detail.

Figure 10A:
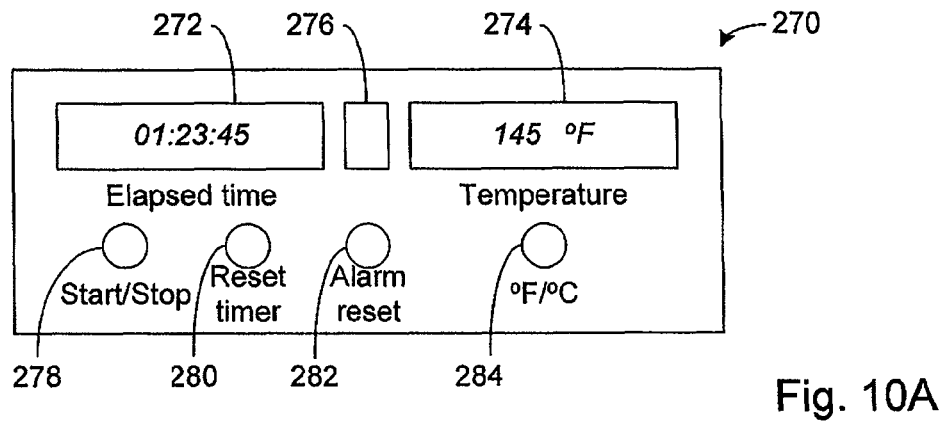
FIGS. 10A-C show by examples some of the functional features that can be implemented in the monitoring system.
Figure 10B:
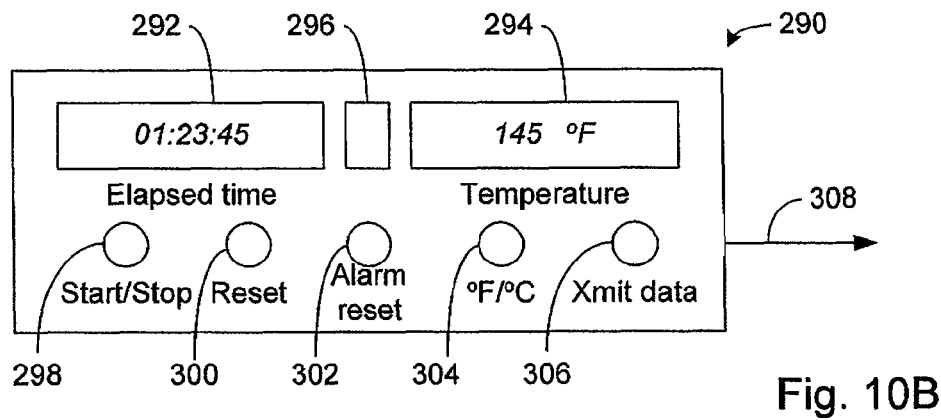
Figure 10C:
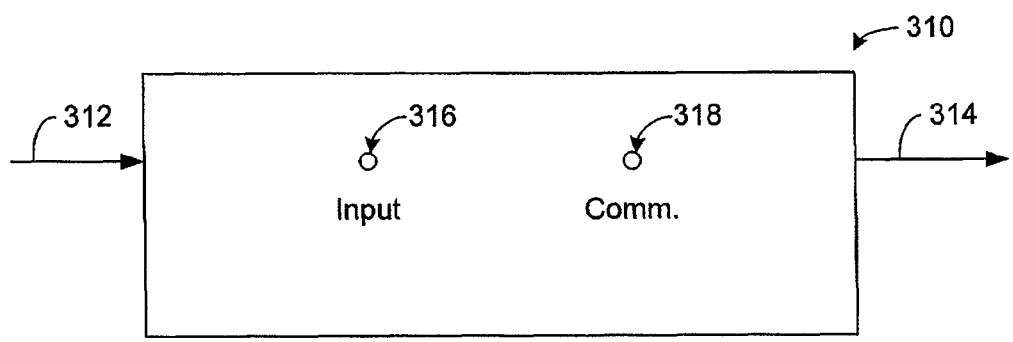

FIGS. 10A-C show by example how some of the functionalities of the monitoring system 240 can be implemented. As shown in FIG. 10A, one example embodiment of a function component 270 includes a time display 272 that can display the elapsed time of the food presentation. Such a timer functionality can be included in the processor (246 in FIG. 9), or be provided by a separate component. The elapsed time 272 can be started and stopped by a button 278. The time display 272 can also be reset to a start value by a button 280.

As shown in FIG. 10A, the example function component 270 further includes a temperature display 274 that displays the temperature sensed by the temperature probe. The temperature indicator 274 can have features such a scale selector 284 that toggles between ° F. and ° C. scales.

As shown in FIG. 10A, the example function component 270 further includes an alarm 276 that can be triggered by various conditions. Some examples of how such an alarm can be triggered are described below in greater detail. The alarm 276 can be audible or visual, or be a part of an external alarm triggering system, or any combination thereof. The alarm 276 can be acknowledged and reset by a reset button 282.

FIG. 10B shows that the foregoing example functionalities can be combined with data transmission functionality. In one example embodiment of a function component 290, various functionalities such as time display 292 and its controls 298, 300, temperature display 294 and its control 304, and alarm 296 and its control 302, can be similar to those described above in reference to FIG. 10A. In the particular embodiment 290 of FIG. 10B, at least some of the information associated with these functionalities are transmitted to an external component (not shown) as depicted by an arrow 308. Transmission of such information can be initiated and/or terminated by an "Xmit" button 306, and such transmitted information can be further processed externally.

FIG. 10C shows that in one embodiment of a function component 310, the "internal" functionalities include simple indicators 316, 318 that indicate proper operation of an input 312 (e.g., input from a temperature sensor), and an output 314 (e.g., communication to an external component). Such indicators can indicate that the sensor (244 in FIG. 9), processor 246, interface 250, and combinations thereof, are operating normally.

In some embodiments, the function indicators (of FIG. 10C) and other "internal" functionalities (of FIGS. 10A and 10B) can be omitted. In such embodiments, information associated with the sensor, processed or substantially unprocessed, can be sent to an external component via the interface component (250 in FIG. 9).

Figure 11A:
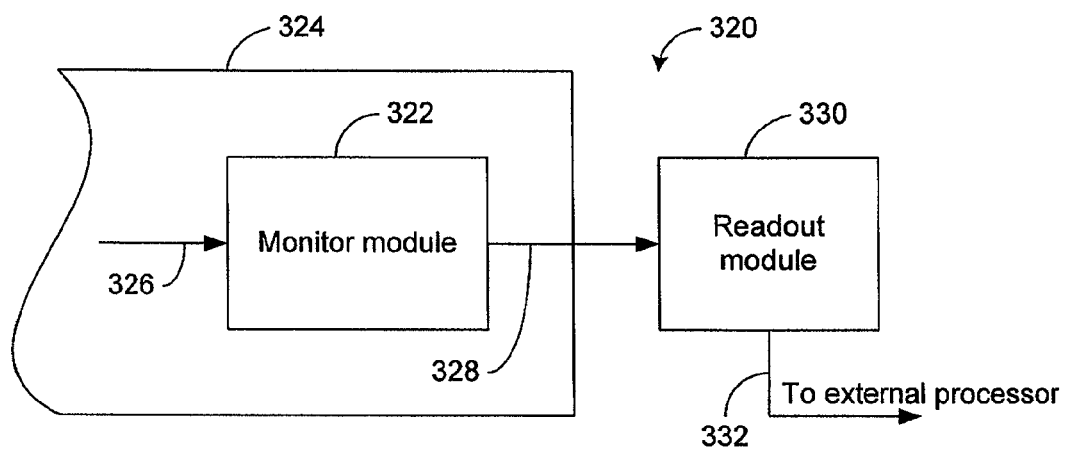
FIGS. 11A and B show by examples some of the readout configurations that can be implemented.
Figure 11B:
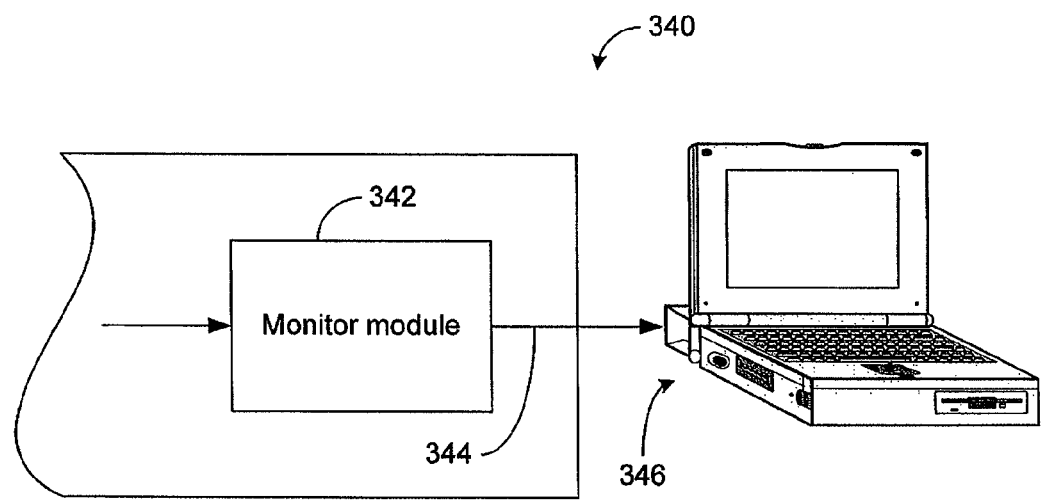

FIGS. 11A-B show examples of such transfer of information to external components. As shown in FIG. 11A, one embodiment of a monitoring system 320 includes a monitor module 322 associated with a monitoring assembly 324. The module 322 can include a processor and/or an interface as described above in reference to FIG. 9. The module can also include "internal" functionalities described above in reference to FIGS. 10A-C.

As shown in FIG. 11A, the module 322 receives a sensor input 326, and outputs a signal 328 that is transferred to an external component. In one embodiment, the external component includes a control/readout module 330 that reads the output 328 of the monitor module 322. Such transfer of information between the monitor module 322 and the control/readout module 330 can be achieved by a wire connection, or by a wireless connection. In one embodiment, the readout monitor 330 transfers the information it obtained to an external processor (as depicted by an arrow 332) for further processing.

FIG. 11B shows that in one embodiment, the external transfer of data can be achieved substantially directly to a computing device. In one embodiment, a monitoring system 340 includes a monitor module 342. Such a module can include a processor and/or an interface configures so that a substantially direct connection 344 can be made between the monitor module 342 and a computing device 346 without a separate external readout component.

Figure 12A:
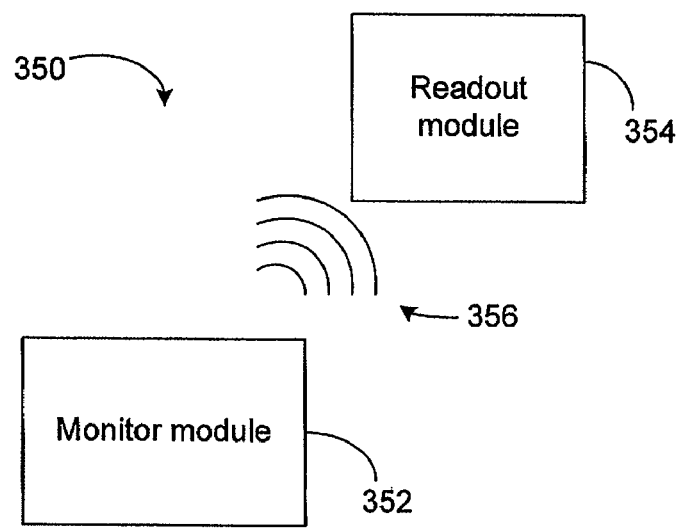
FIGS. 12A-C show that the monitoring system can have one or more monitored-containers in wired or wireless communication with an external control/readout module.
Figure 12B:
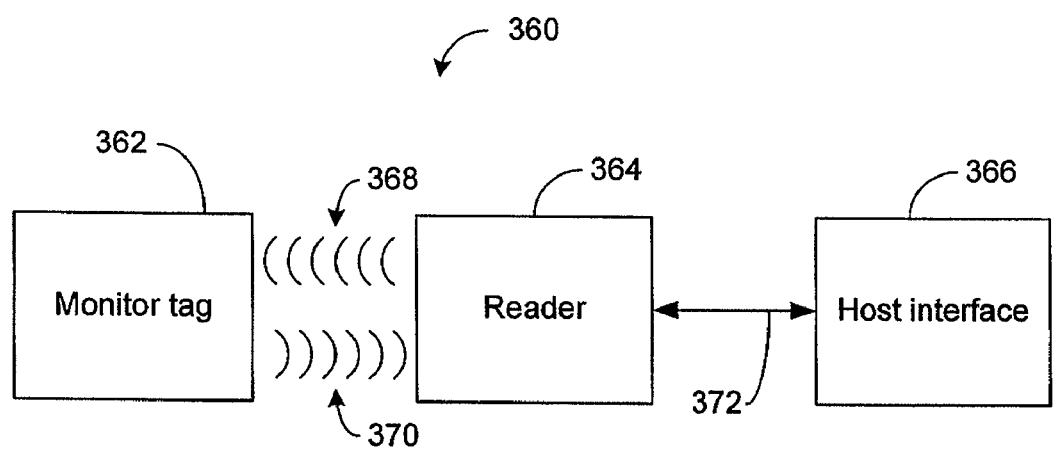
Figure 12C:
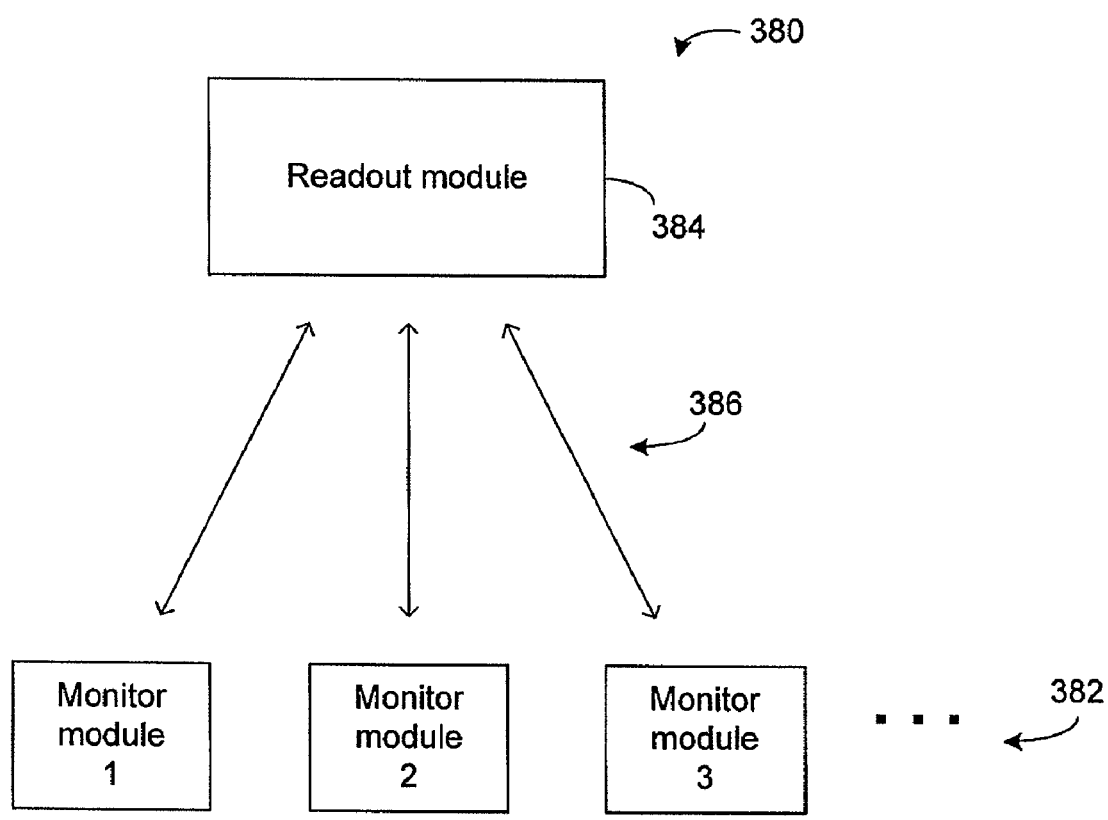

FIGS. 12A-C show some examples of connections that can be made between a monitor module and an external component. As shown in FIG. 12A, one embodiment of a connection 350 includes a wireless link 356 between a monitor module 352 and a control/readout module 354. For the purpose of description of FIG. 12A, the control/readout module 354 can be a component incorporated into a computing device, or a separate unit. The wireless line 356 can be achieved by a number of different methods, including but not limited to, various electromagnetic radiations associated with infrared (IR), visible, ultraviolet (UV), and radiofrequency (RF) spectra. In one embodiment, the control/readout module communicates with the monitor module 352 by unidirectional communication (e.g., receive readings and data from the monitor module 352). In one embodiment, the control/readout module communicates with the monitor module 352 by bidirectional communication (e.g., sending commands and receive readings and data from the monitor module 352). In one embodiment of a unidirectional system, the monitor module 352 sends readout and/or status information on a periodic basis. In one embodiment of a unidirectional system, the monitor module 352 sends readout and/or status information when an alarm condition occurs (e.g., time limit exceeded, food at wrong temperature, toxin detected, etc.). In one embodiment of a unidirectional system, the monitor module 352 sends readings and data in response to a query command from the control/readout modules 354. Similarly, the control/readout modules 330, 364, the monitor 364, etc. can communicate with the various monitors and/or RFID tags using unidirectional or bidirectional communication. The RFID tag can be provided to the food and/or to the food packaging. For example, for packaged food, the RFID tag can be provided to the package. In one embodiment, for unpackaged food (e.g., fruit, vegetables, etc.), the RFID tag can be provided to the food by an attachment.

FIG. 12B shows one specific example embodiment of a wireless connection that can be implemented into the monitoring system described herein. In one embodiment, a wireless connection 360 uses components associated with a radio frequency identification (RFID). The connection includes a monitor "tag" 362 that is either passive or active. For the purpose of description, the tag 362 will be assumed to be passive. However, one can readily see that an active tag can also be used. In one embodiment, the RFID tag includes one or more sensors, such as, for example, temperature sensors, humidity sensors, chemical sensors, biological sensors, etc. In one embodiment, the RFID tag includes a writeable storage area for storing data. In one embodiment, the writeable storage area on the tag is used for storing previous sensor readings, timestamps associated with previous sensors readings, and/or other data that can be used to produce a history for the tag corresponding to one or more environmental parameters (e.g., a temperature profile history, a humidity profile history, a chemical and/or biological profile history, etc.). In one embodiment, the tag includes a product identification code. In one embodiment, the tag includes a unique identifier code. In one embodiment, a unique identification code is stored by the tag in a non-changeable fashion (e.g., read-only memory, write-once memory, etc.). In one embodiment, the unique identifier code is stored in read-write memory. The unique identifier code, if provided, is written to the tag by a manufacturer. The unique identifier code, if provided, is written to the tag by a distributor. The unique identifier code, if provided, is written to the tag by a food provider or other food service establishment.

In one embodiment, the monitor tag 362 is configured to measure the temperature upon interrogation from a reader 364. The reader 364 transmits a selected signal 368 while in the proximity of the tag 362. The tag 362 can be inductively coupled to the reader 364, and thus, become temporarily powered to measure the temperature and respond with a signal 370 having information indicative of the measured temperature and/or data stored on the tag. As shown in FIG. 12B, the reader 364 is in communication with a host interface 366 via a connection 372. The host interface 366 allows the information obtained from the tag 362 to be processed further. One can see that the RFID tag can be implemented in to the food serving container and/or the food items in a variety of ways, including in the various example configurations described herein.

In one embodiment, the reader 364 provides a timestamp to the tag 362. In one embodiment, the tag 362 uses the timestamp to determine if a prescribed period of time has transpired. If the prescribed period has transpired, the tag 362 can save the timestamp and/or save one or more sensor readings. A food service inspector, distributor, and/or food provider can read the sensor history of the tag to determine whether the food has been properly stored or is too old. In one embodiment, the tag is passive and cannot take sensors readings unless the reader 364 or other device provides power to the tag. Thus, a passive tag that has not been powered (e.g., interrogated, or provided with a timestamp) at sufficiently regular intervals will not contain a full environmental history. In one embodiment, a tag that does not contain sufficient environmental history is assumed to correspond to food that has been improperly stored. In one embodiment, a food inspector or inspection system looks for tags that do not contain a sufficient environmental history.

In one embodiment, data is stored on the tag 362 so that data from the tag can be read by a reader 364 used by the manufacturer/distributor/food provider for inventory and control purposes, and by a reader 364 used by an inspector for inspection purposes. In such a system, when the inspector reads one or more tags and finds that the tags contain an insufficient environmental history (e.g., the tags have not bee read enough) then the inspector can cite the manufacturer/distributor/food provider for insufficient inventory control. The manufacturer/distributor/food provider can read the tags of incoming and/or outgoing food to check the freshness of the food and to determine whether the food has been properly stored and transported.

In one embodiment, the reader 364 writes desired information to the tag 362.

In one embodiment, information, such as, for example, sensor readings, from the tag 362 are provided to a database system. In one embodiment, information, such as, for example, sensor readings, from the tag 362 are provided to a regulatory agency. In one embodiment, information, such as, for example, sensor readings, from the tag 362 are provided to a regulatory agency when the data on the tag is out of range (e.g., too hot, too cold, toxins sensed, etc.).

FIG. 12C shows that in one embodiment 380, a plurality of connections can be made between a plurality of monitor modules 382 and a common control/readout module 384. The connections are depicted as arrows 386, and can be wire-based, wireless, and any combination thereof. Such monitoring of multiple modules 382 can be advantageous in certain food serving situations, such as a buffet where multiple food items are served in multiple containers clustered relatively close to each other.

From the examples described above in reference to FIGS. 10-12, one can see that there are numerous ways of processing the sensor information. Thus, the various embodiments shown and described should not be construed as limiting, but rather as examples for achieving desired functionalities in monitoring conditions associated with food presentation.

FIGS. 13-14 show how the monitored information can be used to improve the manner in which food is served. FIG. 13 shows one embodiment of a generalized process 390 that begins at a start state 392, and in a process block 394, samples one or more sensors. In a process block 396, the process 390 processes the one or more sampled signal(s). In a decision block 398, the process 390 determines whether to continue monitoring. If the answer is "Yes," then the process 390 goes to the process block 394. If the answer is "No," the process 390 ends at a stop state 400.

As an example of an application where the process 390 can be used, consider an example food serving situation where the food is to be left on the serving station for two hours. As the food in the serving container is placed at the serving station, a timer is started. Thereafter, a process running either internally (in the monitoring unit) or externally periodically causes the temperature to be measured. The temperature is processed and associated with the corresponding time. Such information can be used internally or externally, as described above. After such processing of temperature and time information, the process determines whether the two hour time limit has been reached or exceeded. If so, the process can indicate as such (e.g., trigger an alarm). The process can continue to indicate the end until acknowledged by a user and stop thereafter. If the two hour time limit has not been reached, the process repeats the monitoring process again after a given period.

FIGS. 14A and 14B show examples of how the information associated with the sensor signal can be utilized. Such utilization can occur while the process of FIG. 13 is in the process block 396, or any time proximate the monitoring duration.

FIG. 14A shows one example process 410 that uses the sampled data. As shown in a process block 412, the sampled data can be stored in a memory location that is either internal to the monitoring unit, or external (e.g., in a storage device associated with a computing device). Such stored data can include the sensor information such as temperature, as well as the time stamp associated with the sampling. One can see that such stored data can be analyzed for compliance with the desired food serving condition.

FIG. 14B shows another example process 420 that uses the sampled data. As shown in a process block 422, the process 420 determines a value associated with the sampled data. In a decision block 424, the process 420 determines whether the value is within a specified range. If "Yes," the process 420 continues with other functions (such as storing the sampled data). If "No," the process 420 in a process block 426 triggers an alarm or other similar measures.

As an example of the process 420 in the food serving setting, the monitored temperature can be compared to limit values of a specified range on a generally "real-time" basis. Thus, for a warm-served food, if the monitored temperature falls below the lower limit value, an alarm or similar indicator can be triggered to mitigate an undesired food serving condition thereafter.

Figure 16:
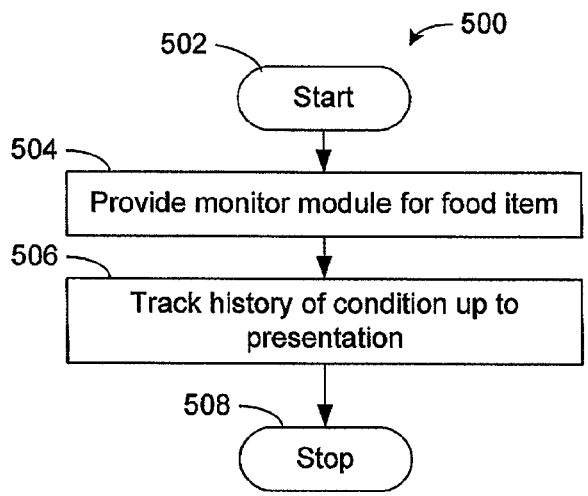
FIG. 16 shows a method for tracking the history of the food items prior to the presentation.
Figure 17A:
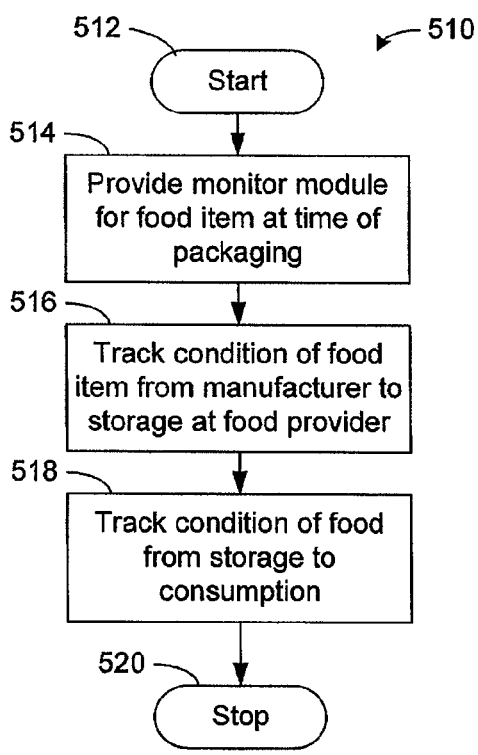
FIGS. 17A and B show example methods for the tracking method of FIG. 16.
Figure 17B:
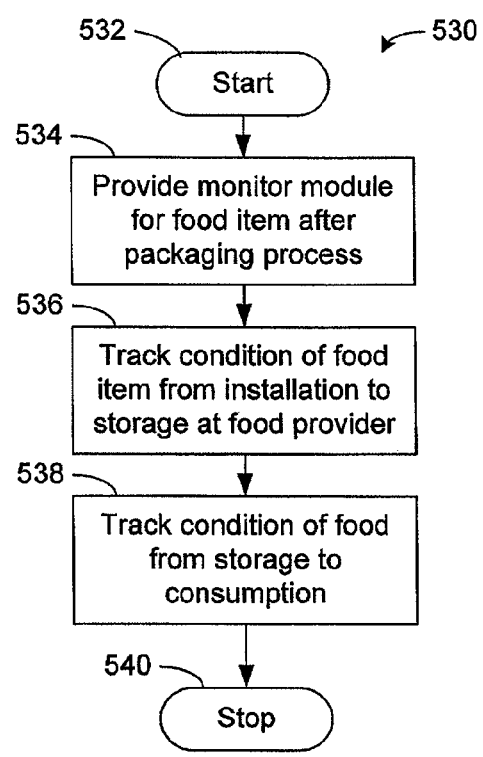

Various techniques for monitoring of food conditions after being served have been described above. FIGS. 15-17 now show that monitoring of food items can also include monitoring of conditions prior to presentation. FIGS. 15A-15F show by example various embodiments of a monitoring system that allows tracking of food items and/or conditions such food items are subjected to. FIG. 16 shows a generalized process for achieving such tracking, and FIGS. 17A and 17B show examples of the generalized process of FIG. 16.

Figure 15A:
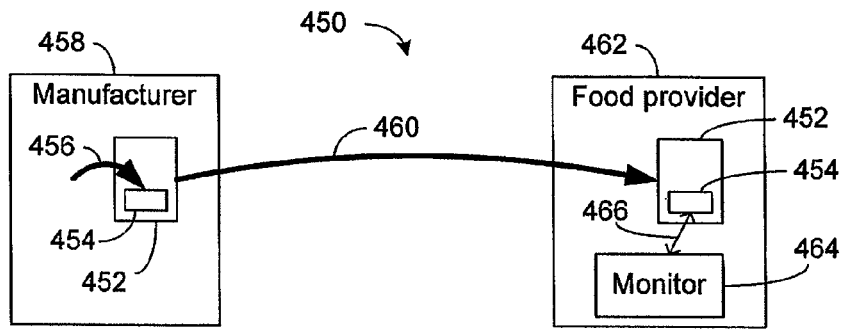
FIGS. 15A-F show by examples how the monitoring system can track conditions of food items prior to presentation to consumers.

FIG. 15A shows one embodiment of an example food condition tracking system 450 where one or more conditions affecting a food item 452 is monitored by a monitor tag 382 that is associated with the food item 452. In one embodiment, the monitor tag 382 can be an RFID device such as that described above in reference to FIG. 12B. As described above, the example RFID tag can be either active or passive. For the purpose of tracking the food item, it will be understood that such a tag (active or passive) is induced to obtain one or more sensor reading prior to the presentation. Such sensor reading can include time information, temperature, and/or any other conditions that can affect the quality of the food item. It will also be understood that the food tracking concept of the present teachings can also be achieved by other types of monitoring sensor elements.

In one embodiment, the association of the monitor tag 382 with the food item 452 can be achieved by mounting the monitor tag 382 to a container or a container-related item for the food item 452. As is generally known, such containers or related items can include, but not limited to, cartons, jars, bottles, lids, caps, and the like. In one embodiment, the monitor tag 382 can further include features such as a bar code for inventory tracking purpose.

As shown in FIG. 15A, the example monitor tag 382 is shown to be associated with the food item 452 (as depicted by an arrow 456) at a manufacturing facility 458. The food item 452 having the monitor tag 382 is shown to be transported (depicted by an arrow 460) to a food provider facility 462. In one embodiment, the monitor tag 382 can be induced to monitor the condition of the food item 452 at the manufacturer 458. As described below in greater detail, the monitor tag 382 can also be induced one or more times during transport to obtain information about the condition the food item 452 is subjected to. Once received by the food provider 462, the monitor tag 382 can be induced by a monitor component 464 to perform one or more readings prior to food presentation.

Figure 15B:
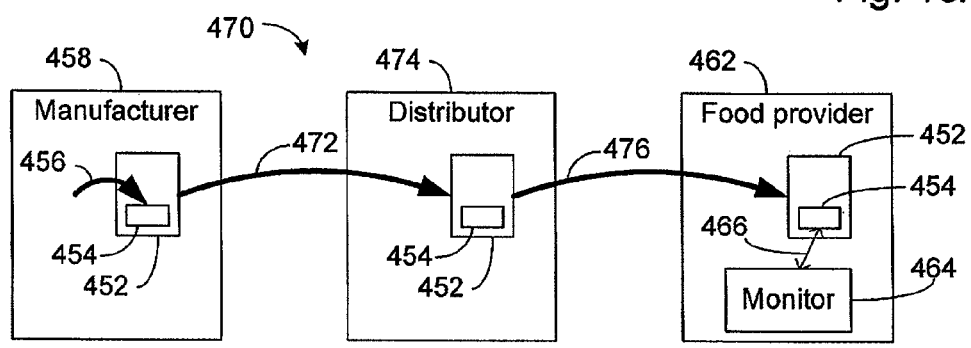

As one can see, there can be numerous possibilities in where and how the monitor tag 382 can be introduced to the food item 452, and how the food item can be delivered to the food provider 462. FIG. 15A shows one of such possibilities. FIG. 15B shows another example embodiment of a tracking system 470 where the monitor tag 382 is introduced to the food item 452 at the manufacturer 458, and the food item 382 is transported (depicted by an arrow 472) to a distributor 474 for distribution. As is generally known, food items can be temporarily stored and inventoried at the distributor 474. Thus, in one embodiment, monitoring of the food item 452 can be achieved at the distributor 474.

As further shown in FIG. 15B, the food item 452 is shown to be transported (arrow 476) from the distributor 474 to the food provider 462. As described above in reference to FIG. 15A, additional monitoring can be performed at the food provider 462. Also as described above in reference to FIG. 15A, monitoring can also be performed during transport, such as the manufacturer-distributor leg 472 and/or the distributor-food provider leg 476.

Figure 15C:
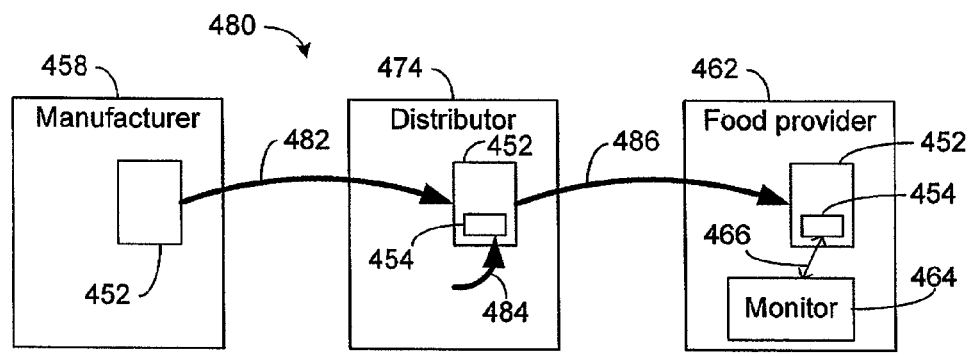

FIG. 15C shows another example embodiment of a tracking system 480, where the manufacturer 458 sends the food item 452 to the distributor 474 (via a transport leg 482) without the monitor tag 382. The monitor tag 382 is shown to be associated with the food item 452 at the distributor facility 474, as indicated by an arrow 484. The food item 382 is then shown to be transported (486) to the food provider 462. Thus, in this example embodiment, monitoring can be performed at the distributor 474, during the distributor-food provider transport leg 486, at the food provider 462, or any combination thereof.

Figure 15D:
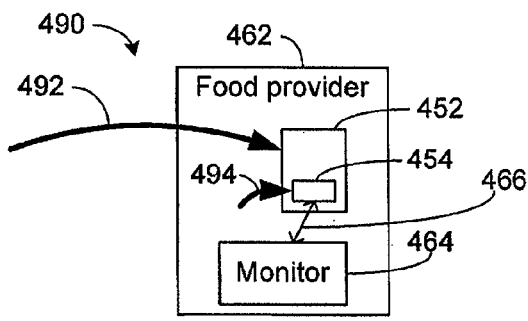

FIG. 15D shows another example embodiment of a tracking system 490, where the food item 452 received at the food provider 462 (via a transport 492) does not include the monitor tag 382. As shown, the monitor tag 382 is shown to be associated with the food item 452 at the food provider facility 462, as indicated by an arrow 494. Thus, in this example embodiment, monitoring can be performed at the food provider 462 during storage of the food item 452 prior to presentation.

Figure 15E:
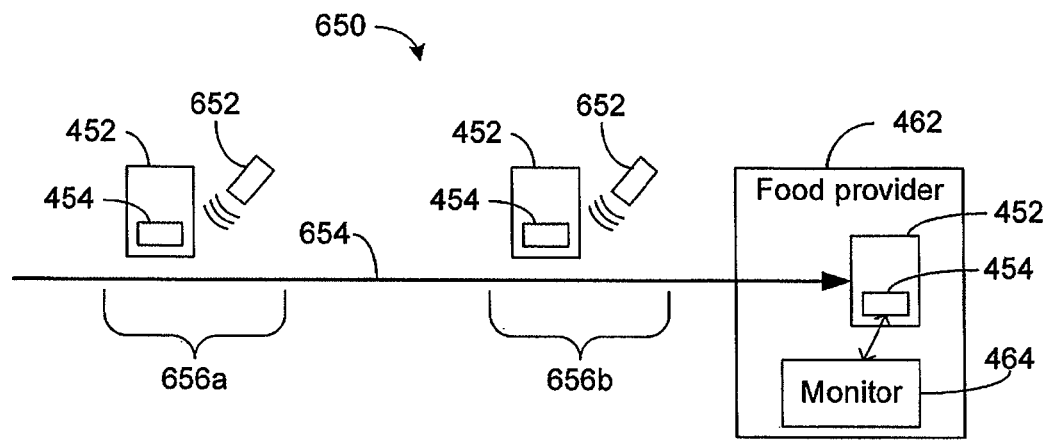
Figure 15F:
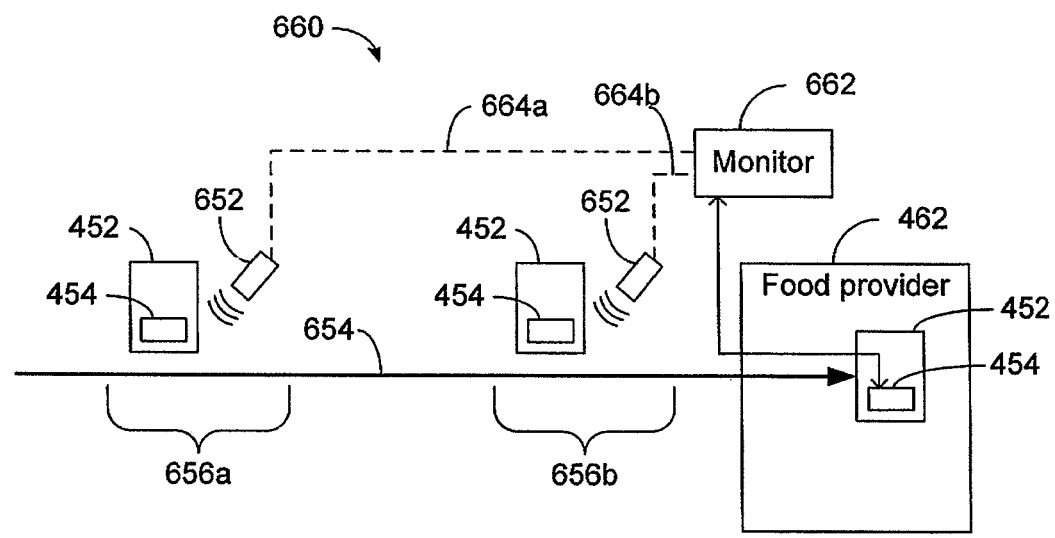

FIGS. 15E and 15F now show by examples that information obtained by the monitor tag 382 associated with the food item 452 can be transferred to a monitoring component in different ways. FIG. 15E shows that in one example embodiment of a tracking system 650, one or more monitoring actions 656 can be performed during a delivery process (arrow 654) of the food item 452. For a given monitoring action, such as that indicated by 656a, an example reader component 652 can induce the monitor tag 382 to obtain information about the food condition. As further shown in FIG. 15E, additional monitoring actions can be performed after delivery. In one embodiment as shown in FIG. 15E, the information obtained by the monitor tag 382 can be transferred to the monitoring component 464 that is located at the food provider facility 462. Information thus obtained can be used by the food provider 462 for internal use and/or for transmitting to an external entity (not shown). Monitoring involving an external entity is described below in greater detail.

FIG. 15F shows that in one example embodiment of a tracking system 660, information obtained during the one or more monitoring actions 656 can be transferred to a monitoring component 662 that is located outside of the food provider facility 462. Thus, information from the monitoring action 656a is transferred from the reader component 652 to the monitoring component 662 via a link 664a. Similarly, information from the monitoring action 656b is transferred from the reader component 652 to the monitoring component 662 via a link 664b. In one embodiment, the external monitoring component 662 can also obtain information from the monitor tag 382 on the food item 452 at the food provider facility 462. In one embodiment, the example external monitoring component 662 can be part of an external monitoring entity. An example of an external monitoring entity is described below in greater detail.

FIG. 16 now shows one embodiment of a process 500 for monitoring and tracking one or more food-related conditions up to the time when the food is presented. Such a process, combined with the food presentation monitoring techniques described herein, can be combined to improve the quality and safety of various types of food consumed by consumers.

The process 500 begins in a start state 502, and in a process block 504, the process 500 associates a monitor module to a food item. In a process block 506, the process 500 "tracks" the history of the food-related condition between the time when the monitor module is introduced, to the time when the food is presented, by obtaining one or more readings from the monitor module during that period and/or information saved on the tag 382. The process 500 ends at a stop state 508.

FIGS. 17A and 17B now show two of many example processes that can achieve the generalized process 500 of FIG. 16. As shown in FIG. 17A, an example process 510 begins at a start state 512, and in a process block 514, the process 510 associates a monitor module to a food item at the time of packaging at a manufacturer. In a process block 516, the process 510 tracks one or more food-related conditions from the manufacturer to storage at a food provider facility. In a process block 518, the process 510 further tracks one or more food-related conditions from storage to presentation. The process 510 ends at a stop state 520.

As shown in FIG. 17B, another example process 530 begins at a start state 532, and in a process block 534, the process 530 associates a monitor module to a food item after the food's packaging process. Such association of the monitor module to the food item can be made, for example, at a distribution facility. In a process block 536, the process 530 tracks one or more food-related conditions from such installation of the monitor module to storage at a food provider facility. In a process block 538 that follows, the process 530 further tracks one or more food-related conditions from storage to presentation. The process 530 ends at a stop state 540.

FIGS. 18-20 now show that various monitoring activities associated with a given food item can be linked to a monitoring and/or regulatory agency. FIG. 18 shows one embodiment of a block diagram of a general functional arrangement for such external monitoring. FIG. 19 shows one embodiment of a process that can perform such external monitoring. FIGS. 20A and 20B show examples of the generalized process of FIG. 19.

In one embodiment as shown in FIG. 18, an external monitoring system 550 can include a food provider 552 having a monitor component 554 that is linked to an agency 556 via a communication link 558. The monitor component 554 can obtain information about the history of the one or more food-related conditions prior to presentation, about one or more food-related conditions during presentation, or any combination thereof.

In one embodiment as shown in FIG. 19, a process 560 can allow monitoring of such information obtained by the monitor component (554 in FIG. 18). In one embodiment, the process 560 in a process block 562 establishes an electronic communication link between the food provider facility and the agency. In one embodiment, such a link is made directly with the monitor component so as to allow automated monitoring. In a process block 564, the monitor component is induced to monitor one or more food-related conditions. In a process block 566, the monitor component is induced to transmit information associated with the one or more food-related conditions if triggered by one or more conditions.

FIGS. 20A and 20B show example processes that can be configured to transmit information to the agency at the occurrence of different triggering events. In one embodiment as shown in FIG. 20A, an example process 570 in a process block 572 induces the monitor component to monitor one or more food-related conditions. In a process block 574, the process 570 induces the monitor component to transmit information to the agency associated with all levels of violations.

In one embodiment as shown in FIG. 20B, not all violations need to be reported to the agency. Thus, an example process 580 in a process block 582 induces the monitor component to monitor one or more food-related conditions. In a process block 584, the process 580 induces the monitor component to transmit information, to the agency, whenever a critical violation is detected. In one embodiment, the process 580 in a process block 586 can further record, but not transmit at that time, information associated with non-critical violations. Such information can be reviewed by the agency either by retrieving the record via the communication link, and/or during an inspection.

Figure 21:
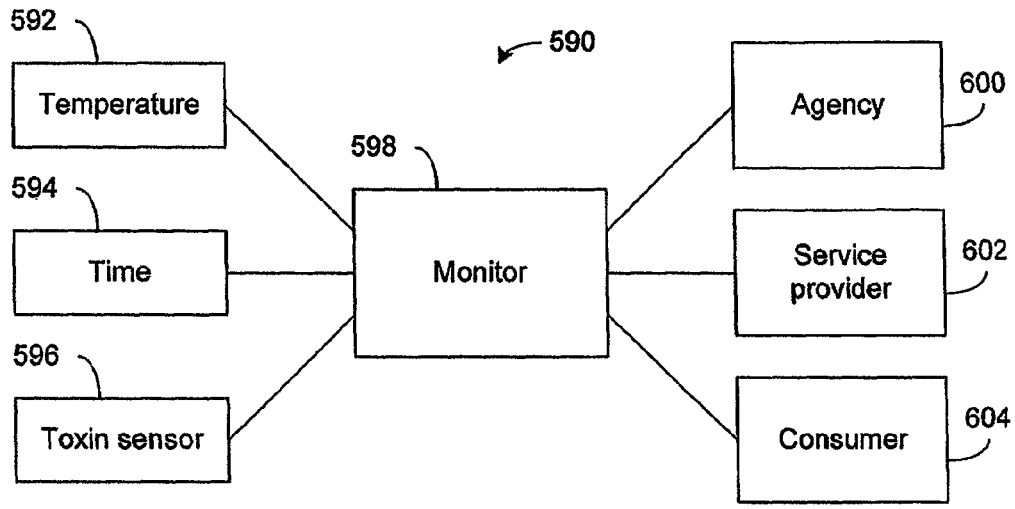
FIG. 21 shows a block diagram of an example monitoring system where the results of monitoring of food-safety related conditions—such as temperature, time, presence of toxins, and the like—can be presented to various entities such as an agency, food service provider, food consumer, or any combination thereof.

FIGS. 21-22 now show that information about one or more food-related conditions can also be presented to consumers of the food item. In certain situations, consumers' knowledge of such information can facilitate reduction of the likelihood that the food item will cause a detrimental effect. For example, in certain food presentation situations such as buffets where food items can be left unattended, it is likely that consumers view the food items more frequently than the servers. When a particular food item runs out, it is common for a consumer to alert a server or management of that fact, so as to allow that food item to be replenished. Similarly, providing information about one or more food-related condition to the consumers can improve the manner in which the management of the food provider facility is alerted.

FIG. 21 shows one embodiment of an example monitoring system 590 that includes a consumer component 604 that is functionally linked to a monitor component 598. As shown in FIG. 21, the monitoring component 598 can also be linked to a service provider component 602 associated with the management of the facility, an agency 600, or any combination thereof. As also shown in FIG. 21, the monitor component 598 is depicted as obtaining information about food-related condition(s) from example inputs from an example temperature sensor 592, an example timer component 594, an example toxin sensor 596, or any combination thereof. Examples of temperature and time components have been described above, and the example toxin sensor is described below in greater detail.

Figure 22A:
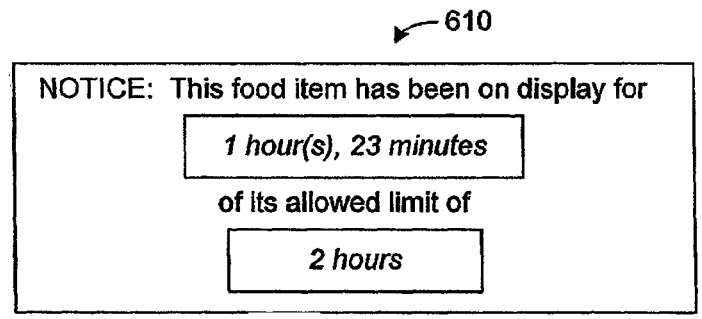
FIGS. 22A-C show by examples how example food-safety related conditions can be presented to the food consumers.
Figure 22B:
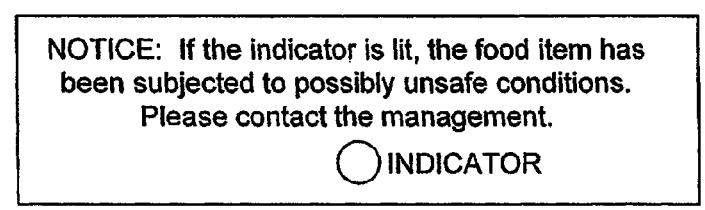
Figure 22C:
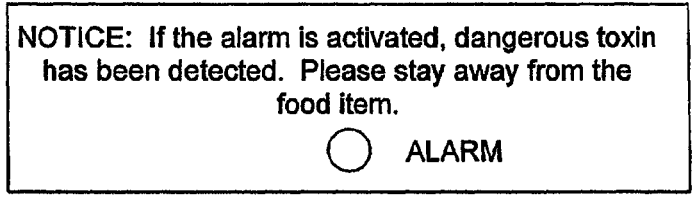

FIGS. 22A-22C now show by examples how information about food-related conditions can be presented to consumers. FIG. 22A shows one embodiment of an example notice device 610 that can be placed adjacent a given food item and conspicuously visible to the consumers. In one embodiment, the example notice device 610 can inform the consumer about how long that particular food item has been on display, and also the allowed limit designated for that food item. Given such "freshness" or "oldness" information, consumers can decide if that food item should be consumed. If the food item has exceeded or approaching the designated time limit, consumers can also alert the management or request that the food item be replaced with fresh food.

FIG. 22B shows one embodiment of an example notice device 620 that triggers an indicator (e.g., visual display, alarm, wireless message, etc.) when one or more specified conditions are met. In certain situations, it can be more desirable to provide general information to consumers (e.g., something is wrong) and specific information to the management (e.g., what is wrong) if the indicator is activated. Thus, in one embodiment, the notice device 620 includes a general indicator (e.g., light, alarm, etc.) for the consumer. The management, once alerted, can assess the situation in greater detail without causing undue alarm to consumers. Such indicator can be configured to be triggered by any number of conditions, including but not limited to, any combination of conditions relating to time, temperature, and presence of toxins, etc.

Toxins in or on food items are present due to natural causes (for example, spoilage) and/or due to introduction by human causes (for example, terrorism). There are a number of detection devices that can detect such toxins and provide an output signal when the detection is positive. Such output signal can be incorporated into the monitoring system of the present teachings as one of the food-related conditions. Information about toxins can be communicated to the various entities disclosed herein (for example, management, government agency, and/or consumers).

FIG. 22C shows one embodiment of an example notice device 630 that alerts consumers when a dangerous toxin is detected in and/or about a food item. The example notice device 630 can be triggered by detection of one or more types of toxins, and once the alarm is triggered, can instruct consumers to stay away from the food item area.

Although the above-disclosed embodiments have shown, described, and pointed out the fundamental novel features of the invention as applied to the above-disclosed embodiments, it should be understood that various omissions, substitutions, and changes in the form of the detail of the devices, systems, and/or methods shown can be made by those skilled in the art without departing from the scope of the invention. Consequently, the scope of the invention should not be limited to the foregoing description, but should be defined by the appended claims.

What is claimed is:

1. A system for monitoring one or more parameters that affect the condition of a food, comprising:
an RFID tag provided comprising at least one sensor, said sensor configured to provide a measurement indicative of one or more parameters related to edibility of said food;
a processor that reads said RFID tag to obtain data from said RFID regarding said one or more parameters, wherein said processor transmits a signal while in the proximity of said RFID tag, and said RFID tag is powered by inductive coupling with said processor.

2. The system of claim 1, wherein said sensor comprises a temperature sensor.

3. The system of claim 1, wherein said sensor comprises a humidity sensor.

4. The system of claim 1, wherein said sensor comprises a chemical sensor.

5. The system of claim 1, wherein said sensor comprises a biological sensor.

6. The system of claim 1, wherein said processor comprises an audible alarm.

7. The system of claim 1, wherein processor comprises a wireless transmitter.

8. The system of claim 1, wherein said processor provides a timestamp to said RFID tag.

9. The system of claim 1, wherein said RFID tag stores said measurements for later readout.

10. The system of claim 1, wherein said RFID tag includes an expiration date.

11. The system of claim 1, wherein said RFID tag stores a history of said parameter.

12. The system of claim 1, wherein said RFID tag comprises a history of timestamps received by said RFID tag.

13. The system of claim 1, further comprising a database system configured to store a record of information from said tag.

14. The system of claim 1, further comprising a database system configured to store a record of information from said tag for use by an inspector.

15. The system of claim 1, processor comprises a visual indicator.

16. The system of claim 1, wherein said processor determines whether there has been a non-critical violation of said parameters related to edibility of said food, wherein said non-critical violation is not likely to directly contribute to food borne illness.

17. The system of claim 1, wherein said processor determines whether there has been a critical violation of said parameters related to edibility of said food, wherein said critical violation is likely to directly contribute directly to food borne illness or other health hazard.

18. A system for monitoring parameters that affect the condition of a food, comprising an RFID tag having at least one sensor, said sensor configured to provide a measurement indicative of one or more parameters related to edibility of said food, wherein said RFID tag is configured to measure said one or more parameters upon interrogation from a reader, wherein said reader transmits a signal while in the proximity of said RFID tag, and said RFID tag is powered by inductive coupling with said reader.

* * * * *